(12) United States Patent
Penic et al.

(10) Patent No.: US 8,296,657 B2
(45) Date of Patent: Oct. 23, 2012

(54) RANDOM IMAGE SELECTION WITHOUT VIEWING DUPLICATION

(75) Inventors: David Penic, San Diego, CA (US); Wade Ichishita, San Diego, CA (US)

(73) Assignees: Sony Corporation, Tokyo (JP); Sony Electronics, Inc., Parkridge, NJ (US)

(*) Notice: Subject to any disclaimer, the term of this patent is extended or adjusted under 35 U.S.C. 154(b) by 357 days.

(21) Appl. No.: 12/468,817

(22) Filed: May 19, 2009

(65) Prior Publication Data
US 2010/0299602 A1 Nov. 25, 2010

(51) Int. Cl.
G06F 3/00 (2006.01)
G11B 21/10 (2006.01)

(52) U.S. Cl. ............... 715/730; 715/732; 369/47.55; 369/53.37; D6/308

(58) Field of Classification Search ............ 715/730
See application file for complete search history.

(56) References Cited

U.S. PATENT DOCUMENTS

| | | | | | |
|---|---|---|---|---|---|
| 4,573,681 | A | * | 3/1986 | Okada | 463/21 |
| 5,860,936 | A | * | 1/1999 | Levin | 600/558 |
| 5,956,738 | A | * | 9/1999 | Shirakawa | 715/273 |
| 6,738,075 | B1 | * | 5/2004 | Torres et al. | 715/723 |
| 7,406,692 | B2 | * | 7/2008 | Halpern et al. | 718/105 |
| 7,640,438 | B2 | * | 12/2009 | Varadarajan et al. | 713/193 |
| 7,798,895 | B2 | * | 9/2010 | Jubinville et al. | 463/18 |
| 2002/0003761 | A1 | * | 1/2002 | Jin | 369/47.55 |
| 2003/0042673 | A1 | * | 3/2003 | Grauzer et al. | 273/149 R |
| 2004/0051248 | A1 | * | 3/2004 | Griesse et al. | 273/283 |
| 2004/0078111 | A1 | * | 4/2004 | Reese et al. | 700/213 |
| 2006/0031846 | A1 | * | 2/2006 | Jacobs et al. | 719/313 |
| 2006/0155419 | A1 | * | 7/2006 | Reese et al. | 700/213 |
| 2006/0212142 | A1 | * | 9/2006 | Madani et al. | 700/49 |
| 2006/0221222 | A1 | * | 10/2006 | Hirasawa | 348/333.01 |
| 2006/0265421 | A1 | * | 11/2006 | Ranasinghe et al. | 707/104.1 |
| 2007/0155459 | A1 | * | 7/2007 | Kinzer et al. | 463/9 |
| 2007/0172200 | A1 | * | 7/2007 | Watanabe et al. | 386/95 |
| 2008/0021988 | A1 | * | 1/2008 | Abernethy et al. | 709/223 |
| 2008/0129243 | A1 | * | 6/2008 | Nashiki | 318/701 |
| 2009/0073193 | A1 | * | 3/2009 | Nagaraj et al. | 345/649 |
| 2009/0219245 | A1 | * | 9/2009 | Frankel et al. | 345/104 |
| 2009/0271477 | A1 | * | 10/2009 | Fothergill-Zittrer | 709/203 |
| 2009/0295789 | A1 | * | 12/2009 | Yao et al. | 345/418 |
| 2009/0318231 | A1 | * | 12/2009 | Lange | 463/42 |
| 2009/0322982 | A1 | * | 12/2009 | Finnegan | 349/58 |

(Continued)

OTHER PUBLICATIONS

Discussion forum at Computer Science Canada <http://compsci.ca>, "How to generate random numbers without repletion?", published on May 29, 2004, 4 pages.*

(Continued)

*Primary Examiner* — William Bashore
*Assistant Examiner* — Reza Nabi
(74) *Attorney, Agent, or Firm* — Trellis IP Law Group, PC

(57) ABSTRACT

Particular embodiments generally relate to randomly displaying images on a display device. In one embodiment, a list of images for display on a display device, such as a digital picture frame or television, is determined. The display device is configured to display different images in a sequential order (such as one after another). A random display method may be determined. An image in the list of images is then randomly selected based on the random display method. For example, images are randomly selected such that all images in a list of images are displayed once without duplicative display of an image.

20 Claims, 6 Drawing Sheets

U.S. PATENT DOCUMENTS

| | | | | |
|---|---|---|---|---|
| 2010/0045681 A1* | 2/2010 | Weissmueller et al. | 345/501 |
| 2010/0131851 A1* | 5/2010 | Reese et al. | 715/732 |
| 2010/0245868 A1* | 9/2010 | Wade et al. | 358/1.9 |
| 2011/0058713 A1* | 3/2011 | Kogane et al. | 382/118 |
| 2011/0070937 A1* | 3/2011 | Kinzer et al. | 463/9 |
| 2011/0122445 A1* | 5/2011 | Silverbrook | 358/1.15 |

OTHER PUBLICATIONS

Random number generator by Stattrek, wayback machine, <http://web.archive.org>, archived on Mar. 19, 2008, 6 pages.*

Discussion forum at Rose India <http://roseindia.net>, "Generate array of random numbers without repletion", published on Jul. 2, 2010, 3 pages.*

Digital Photo Frame review by Mike Pasini, published on Apr. 2007, 7 pages.*

Discussion forum at Computer Science Canada compsci.ca>, "How to generate random numbers without repletion?", published on May 29, 2004, 4 pages.*

Random number generator by Stattrek, wayback machine, web.archive.org>, archived on Mar. 19, 2008, 6 pages.*

Discussion forum at Rose India roseindia.net>, "Generate array of random numbers without repletion", published on Jul. 2, 2010, 3 pages.*

* cited by examiner

RANDOM IMAGE SELECTION WITHOUT VIEWING DUPLICATION

BACKGROUND

Particular embodiments generally relate to image display.

In liquid crystal display (LCD) image displays, such as a digital photo frame or television, digital images may be sequentially displayed. Images may be randomly selected from the entire picture set available. For example, if there are ten pictures to choose from, a random selection from those ten pictures is performed for each image that is displayed. That is, the odds are 1 in 10 for any picture of the ten to be selected for display each time a picture is displayed. A main drawback of this method is that any one picture could be possibly selected several times before another picture has been displayed even once.

SUMMARY

Particular embodiments generally relate to randomly displaying images on a display device. In one embodiment, a list of images for display on a display device, such as a digital picture frame or television, is determined. The display device is configured to display different images in a sequential order (such as one after another). A random display method may be determined. An image in the list of images is then randomly selected based on the random display method. For example, images are randomly selected such that all images in a list of images are displayed once without duplicative display of an image.

In one embodiment, a plurality of random display methods may be provided. In one method, identifiers may be assigned to the list of images. These identifiers may be added to numbers 1–N of a first matrix. A number from 1–N in the first matrix is then randomly selected. An image corresponding to an identifier for the selected number is then determined and displayed. The number is then moved from the first matrix to a second matrix. The method continues as numbers are randomly selected and images corresponding to the selected identifiers are displayed. Each time a number is randomly selected from 1–N, the first matrix is checked to see if it includes the identifier. If not, the image has already been displayed. A new number from the list may be randomly selected. If the number is in the first matrix, the image is displayed and the number is moved from the first matrix to the second matrix. After all of the images in the list have been displayed once, the numbers may be moved from the second matrix to the first matrix.

In another embodiment, the identifiers for the list of images may be randomly mixed. Then, identifiers may be sequentially selected from the mixed list. For example, identifiers may be pulled from the top down or from the bottom up. An image is displayed that is associated with the selected number.

In one embodiment, a method is provided that comprises: (a) determining a list of images for display on a display device, wherein the display device is configured to display images in an order in a round, the round being a display of a number of images equal to a number of images in the list; (b) determining a random display method to use to select an image to display on the display device; (c) randomly selecting an image from the list of images based on the random display method; (d) displaying the image on the display device; and (e) performing (c)-(d) until all images from the list of images have been displayed in the round, wherein the random display method determined displayed all images in the list of images once without displaying a duplicative image in the round.

In another embodiment, an apparatus is provided that comprises: one or more computer processors; and logic encoded in one or more tangible media for execution by the one or more computer processors and when executed operable to: (a) determine a list of images for display on the apparatus, wherein the apparatus is configured to display images in an order in a round, the round being a display of a number of images equal to a number of images in the list; (b) determine a random display method to use to select an image to display on the apparatus; (c) randomly select, using the one or more computer processors, an image from the list of images based on the random display method; (d) display the image on the apparatus; and (e) perform (c)-(d) until all images from the list of images have been displayed in the round, wherein the random display method determined displayed all images in the list of images once without displaying a duplicative image in the round.

In yet another embodiment, a method is provided that comprises: (a) determining a list of images for display on a display device, wherein the display device is configured to display images in an order in a round, the round being a display of a number of images equal to a number of images in the list; (b) assigning a list of identifiers for the list of images in a data structure; (c) randomly selecting an identifier from the list of identifiers; (d) determining if the selected identifier is found in the data structure; (e) if the selected identifier is found in the data structure, performing: determining an image corresponding to the selected identifier; displaying the image; and removing the image from the list of images; (f) if the selected identifier is not found in the data structure, not displaying image corresponding to the selected identifier; (g) performing (c)-(f) until all images from the list of images have been displayed, wherein the random display method determined displayed all images in the list of images once without displaying a duplicative image in the round.

A further understanding of the nature and the advantages of particular embodiments disclosed herein may be realized by reference of the remaining portions of the specification and the attached drawings.

DETAILED DESCRIPTION OF EMBODIMENTS

Figure 1:
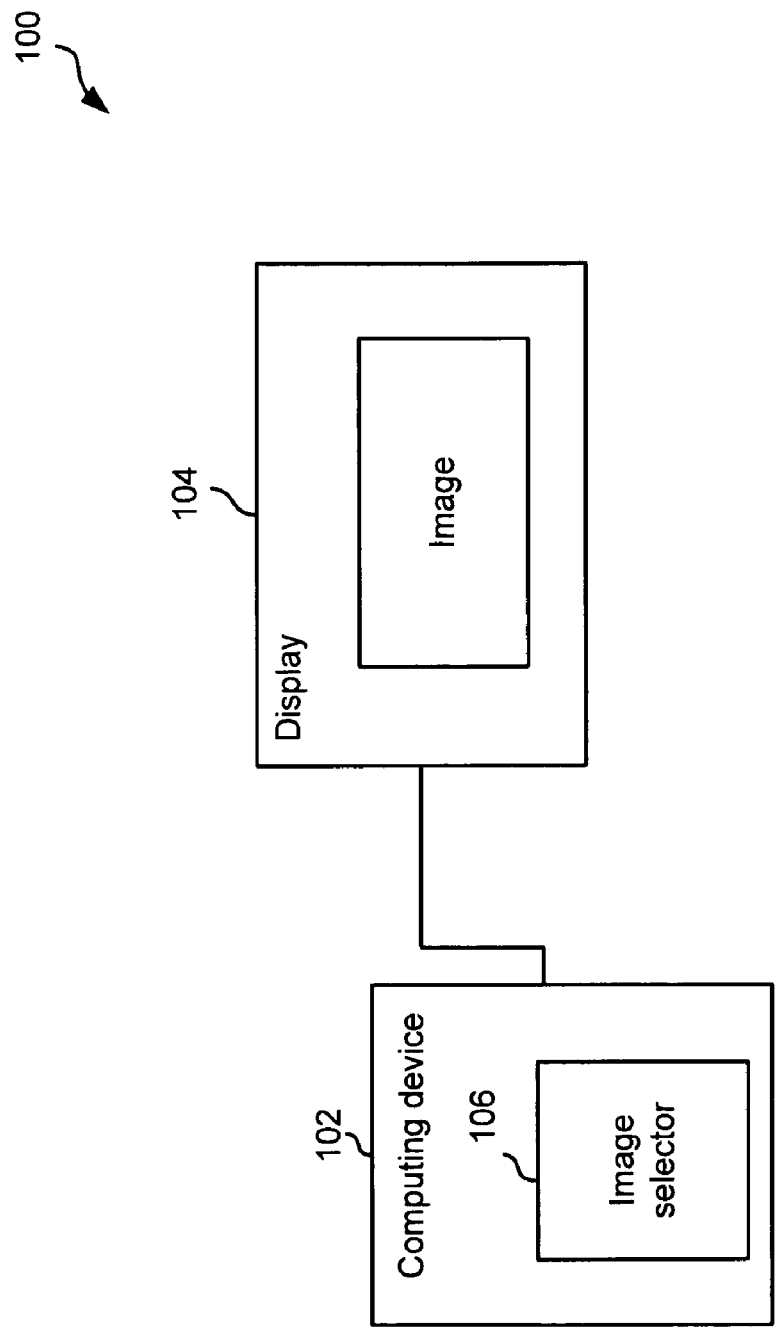
FIG. 1 depicts a simplified system of a method for randomly displaying images according to one embodiment.

FIG. 1 depicts a simplified system 100 of a method for randomly displaying images according to one embodiment. A computing device 102 and a display 104 are provided. It will be understood that computing device 102 and display 104 may be an integrated system. Also, computing device 102 and display 104 may be separate systems that may communicate through a communication medium. Examples of system 100 include a digital photo frame, a television, a digital camera, a cellular phone, a computer, or other devices that can display images.

Computing device 102 includes an image selector 106. Image selector 106 is configured to randomly select images from a list of images. For example, a list of images may be displayed sequentially on display 104. In one example, ten digital images may be included in the list and are continuously displayed one after another. Image selector 106 is configured to randomly select images from the list in such a way that all ten images are randomly displayed once without displaying an image a second time. Different methods of randomly selecting images will be described below.

Display 104 may be any kind of display device, such as a liquid crystal display (LCD). Display 104 may display digital images. The digital images may be in different formats, such as JPEG, or any proprietary format for an image. The image may be a photograph that was taken using a capture device, such as a digital camera, or may have been electronically created (e.g., a pdf document). In other embodiments, the image may be different from a photograph, such as an image of a document, a snapshot of a video, a portion of a file (e.g., a text document), audio/video files, static image files, or audio data. The image as described may be any digitally formatted information that can be displayed. The images may also be static or dynamic.

Figure 2:
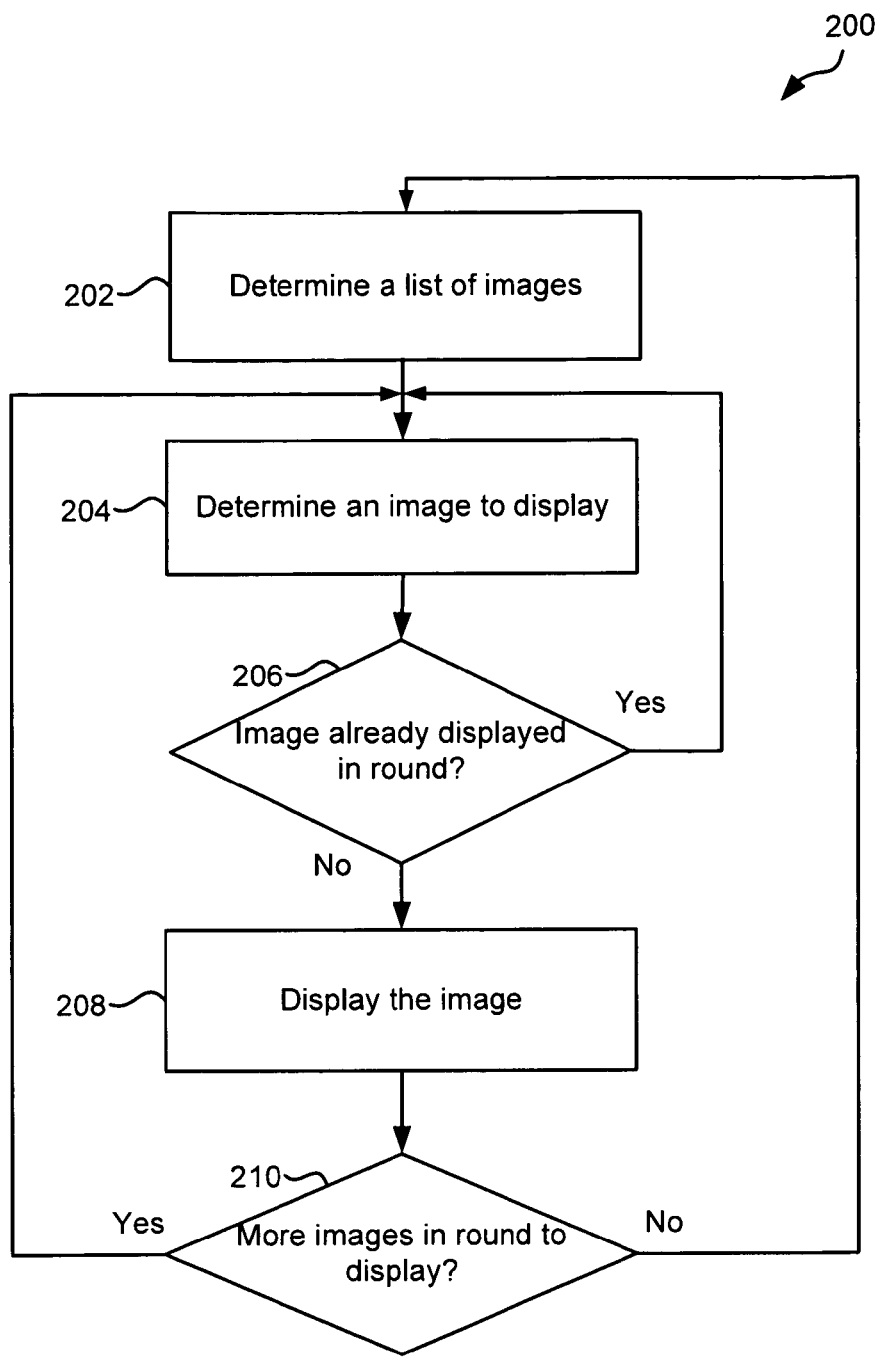
FIG. 2 depicts a general method for randomly displaying images.

FIG. 2 depicts a simplified flowchart 200 of a general method for randomly displaying images according to one embodiment. More detailed embodiments for displaying images will be described below. In one embodiment, computing device 102 may perform steps of the method.

Step 202 determines a list of images. For example, the number of images may be 1–N. One round of displaying the image may be displaying a number of images equal to the number in the list. If there are ten images in the list, a round is when ten images are displayed. After the round is displayed, another round of images may be displayed (the same list again or a new list).

Step 204 determines an image to display. The image to display may be randomly determined such that duplication of a displayed image is not allowed until all the images in the list are displayed once. In one example, identifiers for the images may be randomly input into a random function, which randomly selects an identifier. In this case, the identifier for the image is directly selected for display using the random function. In one example, the original identifier of the image (i.e., name or number depending on if it was edited before being either downloaded into the picture frame or is on memory stick) may have a temporary suffix attached to the image which would be generated by the random function. When the suffix is selected by the random function, the suffix is used to identify the image through its identifier. This would allow the image to be directly selected using the suffix as a means to sequentially compile the images for displaying.

Step 206 determines if the image has already been displayed in the round. If the image has been displayed, the process reiterates to step 204 where a different image is selected. Different methods may be used to ensure that an image is not displayed twice in a round. These methods will be described in more detail below.

If the image has not been already displayed, step 208 displays the image. Step 210 then determines if there are more images to display in the round; if so, the process reiterates to step 204. If every image in the round has been displayed, the process reiterates to step 202 where the list of images may be redisplayed again in a different round. This new round may display the images in a new random order. Also, a different list of images may now be displayed in a new round.

Figure 3:
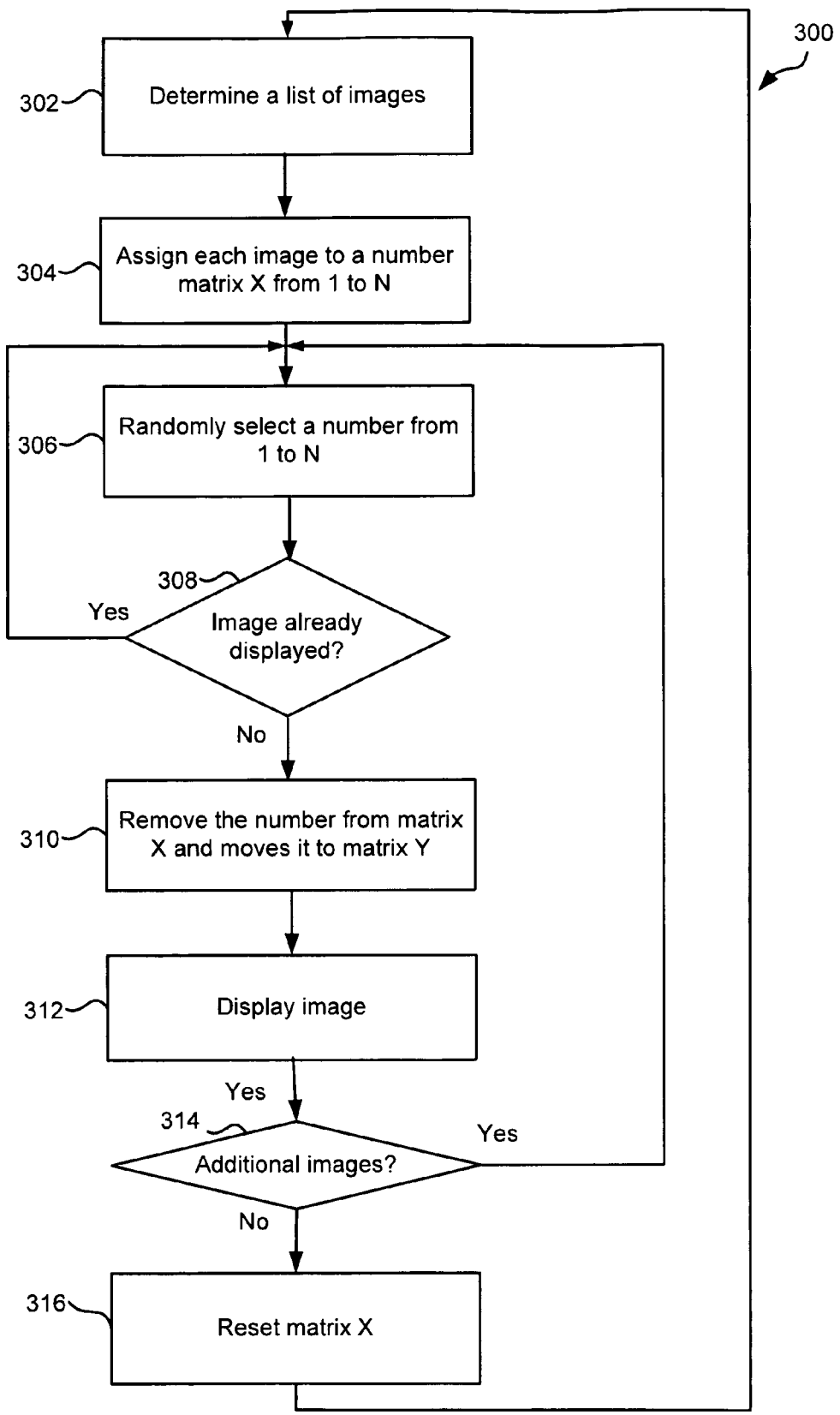
FIG. 3 depicts a simplified flowchart of a method for randomly displaying images according to one embodiment.

One method of randomly displaying images will now be described. FIG. 3 depicts a simplified flowchart 300 of a method for randomly displaying images according to one embodiment. Step 302 determines a list of images. Step 304 assigns each image to a number matrix X from 1 to N. That is, each image may be assigned a number in the matrix. Although a matrix is described, it will be understood that the matrix may be any data structure that can store the numbers. The numbers may also be identifiers for the images and do not need include every number in a sequential order or be numbers (e.g., they may be 1, 10, 100 or may be A, B, C).

Step 306 randomly selects a number from 1 to N. The random selection may use any method for randomly selecting a number, such as a random number generator.

Step 308 determines if the number corresponds to an image that has been displayed already in the round. For example, matrix X is checked to see if the number is included in the matrix. If the number not included, then the image has already been displayed. In this case, the process reiterates to step 306 in which another number is randomly selected from 1–N. This check occurs until a random number is selected that corresponds to an image that has not been displayed in this round.

If the number is included in matrix X, step 310 removes the number from matrix X and moves it to matrix Y. Matrix Y may be a second matrix that stores the numbers until each image has been displayed once in the list of images. Moving the number to matrix Y may not be necessary. For example, it may just be removed from matrix X.

Step 312 displays the image. Step 314 determines if there are additional images. For example, matrix X may be checked to see if any numbers are still included in it. If there are additional images, the process reiterates to step 306 in which a random number is selected again. This process continues as images are randomly selected and displayed.

If there are no more images, step 316 resets matrix X. For example, matrix X may be reset to its original state or the numbers from matrix Y may be moved from matrix Y to matrix X. The process then reiterates to step 302 where a list of images are selected again.

The above process may randomly select multiple numbers from 1–N until a number is selected that is included in matrix X in steps 306 and 308. For example, after image 5 is selected, it is removed from matrix X. However, the random selection is still performed from 1–N (which still includes the number 5). Thus, the number 5 could still be randomly selected. However, if the number is not in matrix X, the image is not displayed again. With the processing power of computers, this may not be a noticeable delay to select a number of an image that has not been displayed in the list yet. However, a different method may be used to randomly select the images when a small number of images are left in the list. For example, only the numbers found in matrix X may be used in the random selection. That is, if the numbers 1, 4, 6, and 8 out of 100 numbers are left in matrix X, then the random number generator randomly selects among these numbers. Also, the random number generator may only select from numbers in matrix X at all times. That is, once a number is removed from matrix X, the random number generator cannot randomly select that number anymore. In addition to these two methods, the following method may be used.

Figure 4:
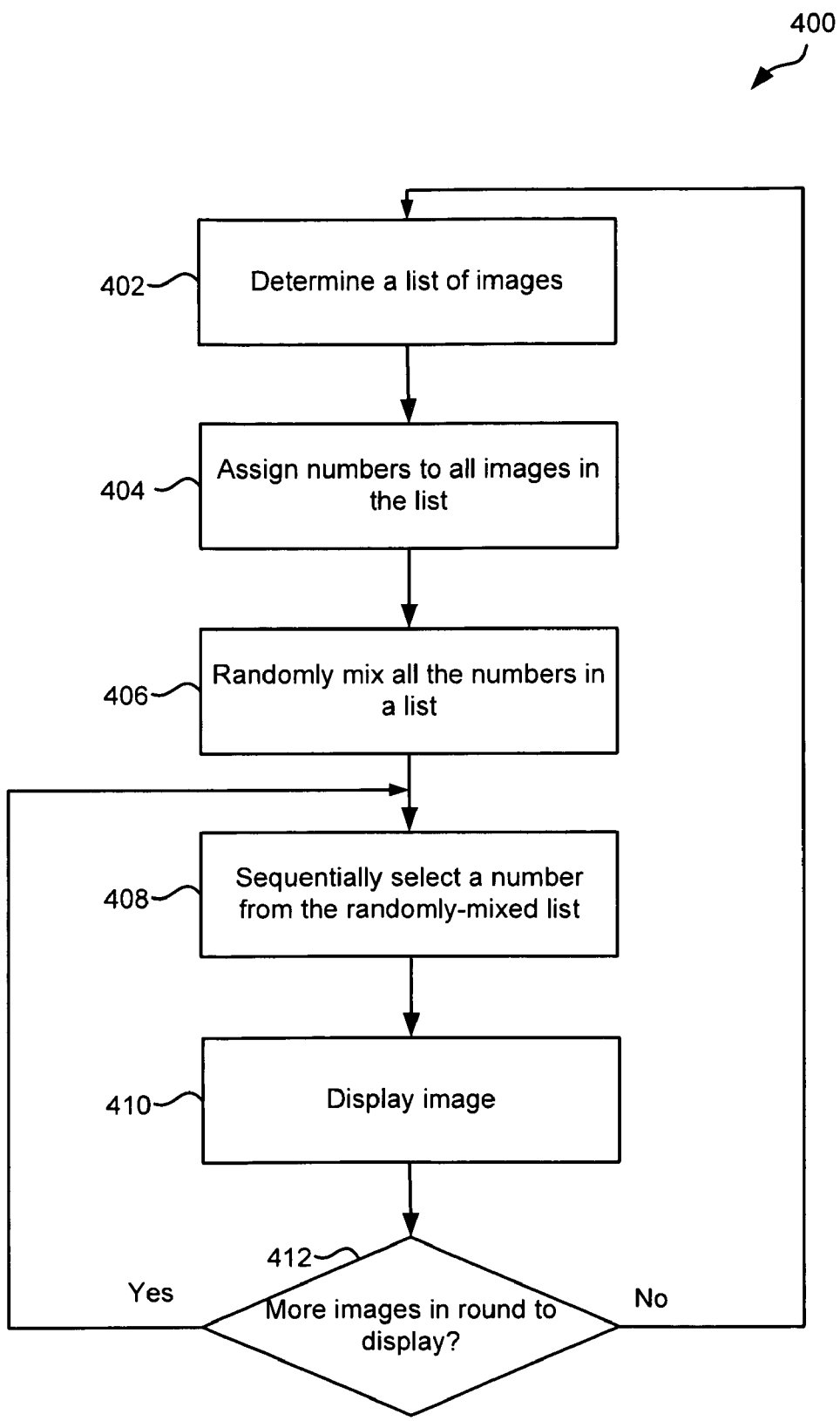
FIG. 4 depicts a simplified flowchart of a method for randomly selecting images using a random mixing of the list according to one embodiment.

FIG. 4 depicts a simplified flowchart 400 of a method for randomly selecting images using a random mixing of the list according to one embodiment. The method may be performed by computing device 102.

Step 402 determines a list of images. For example, the number of images may be 1–N.

Step 404 assigns numbers to all images in the list. The numbers can be any identifier that is associated with the image. Step 406 then randomly mixes all the numbers in a list. The random mixing may be performed based on a random number generator or another random function. The list of numbers may be randomly determined, such as a list of 5 numbers may be 4, 2, 3, 5, and 1.

Step 408 sequentially selects a number from the randomly-mixed list. For example, the selection may be top down or bottom up (or may start in the middle and proceed down or up such that it wraps around). Step 410 then displays the image. Step 412 determines if there is another image to display in the round. If images are left, the process reiterates to step 402. In one example, if the top of the mixed order is used, the first number is selected, which displays image number 4. Then, the second slot in the list is selected and image number 2 is selected. This process continues as images 3, 5, and 1 are displayed.

The process of mixing the numbers and pulling numbers sequentially may not include the possible extra steps of randomly selecting a number for an image that has already been displayed as discussed in FIG. 3. The next method may combine the two display methods (and any other display methods). The method described in FIG. 3 may be used while there are a large number of images in the first matrix. With a large number of images, it is more likely that an image may be randomly selected. After a threshold of images has been displayed, the display method may switch to the second display method where the numbers from the remaining images are mixed and sequentially selected. Using this method may require less memory. For example, a large image set may require a large amount of memory to implement the second method. However, less memory may be used to use the first display method to select and eliminate some images from the set followed by the second display method of mixing the remaining images randomly and selecting them sequentially.

Figure 5:
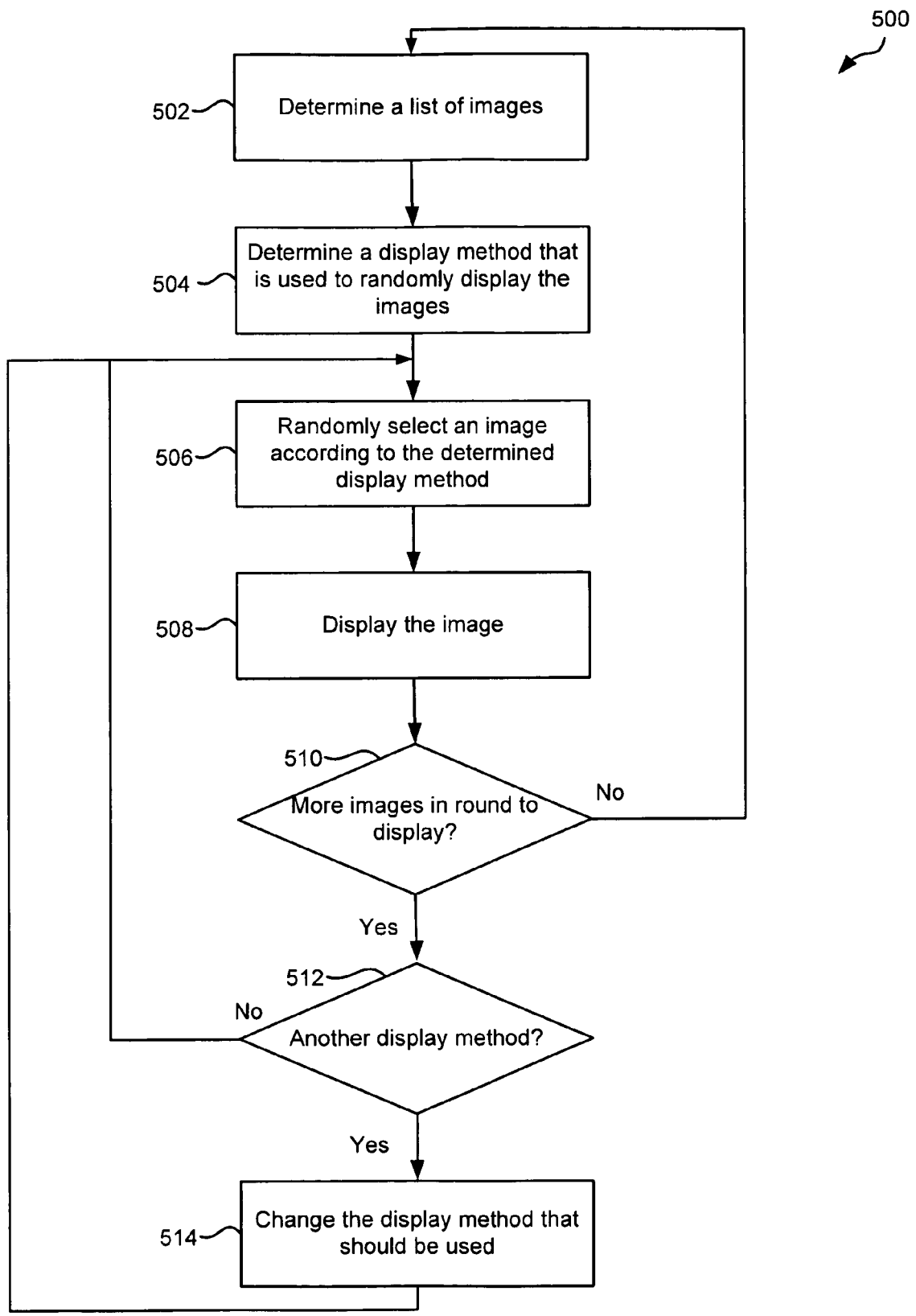
FIG. 5 depicts a simplified flowchart of a method for randomly displaying images using multiple display methods according to one embodiment.

FIG. 5 depicts a simplified flowchart 500 of a method for randomly displaying images using multiple display methods according to one embodiment. Step 502 determines a list of images. Step 504 determines a display method that is used to randomly display the images. For example, a plurality of display images may be used. In one example, multiple display methods may be used in displaying one round of the list of images. As discussed above, as pictures are displayed in the list of images, different display methods may be used to optimally display the images. For example, the method described in FIG. 3 may be used to display the first images that are displayed in a list. However, after displaying a certain number of images, the method described in FIG. 4 may be used. This may eliminate the random selection of images that have already been displayed and having to randomly select another image until an image that has not been displayed is selected.

Step 506 randomly selects an image according to the determined display method. Step 508 displays the image.

Step 510 determines if another image needs to be displayed in a round of displaying the list. If not, the process may reiterate where the list of images may be displayed again in another round.

If another image should be displayed, step 512 determines if another display method should be used. For example, a threshold may be used to determine if another display method should be used. In one example, after a certain number of images have been displayed, another display method may be used.

If another display method is not going to be used, the process reiterates to step 506 in which an image is selected according to the previously selected display method. If another method is going to be used, step 514 changes the display method that should be used. The process then reiterates to step 506 where an image is selected according to the new display method.

The above process continues until the list of images is displayed once without duplicating any images. After all images in the list of images have been displayed once, the process may be repeated. The above process uses multiple display methods while displaying one round of images.

Figure 6:
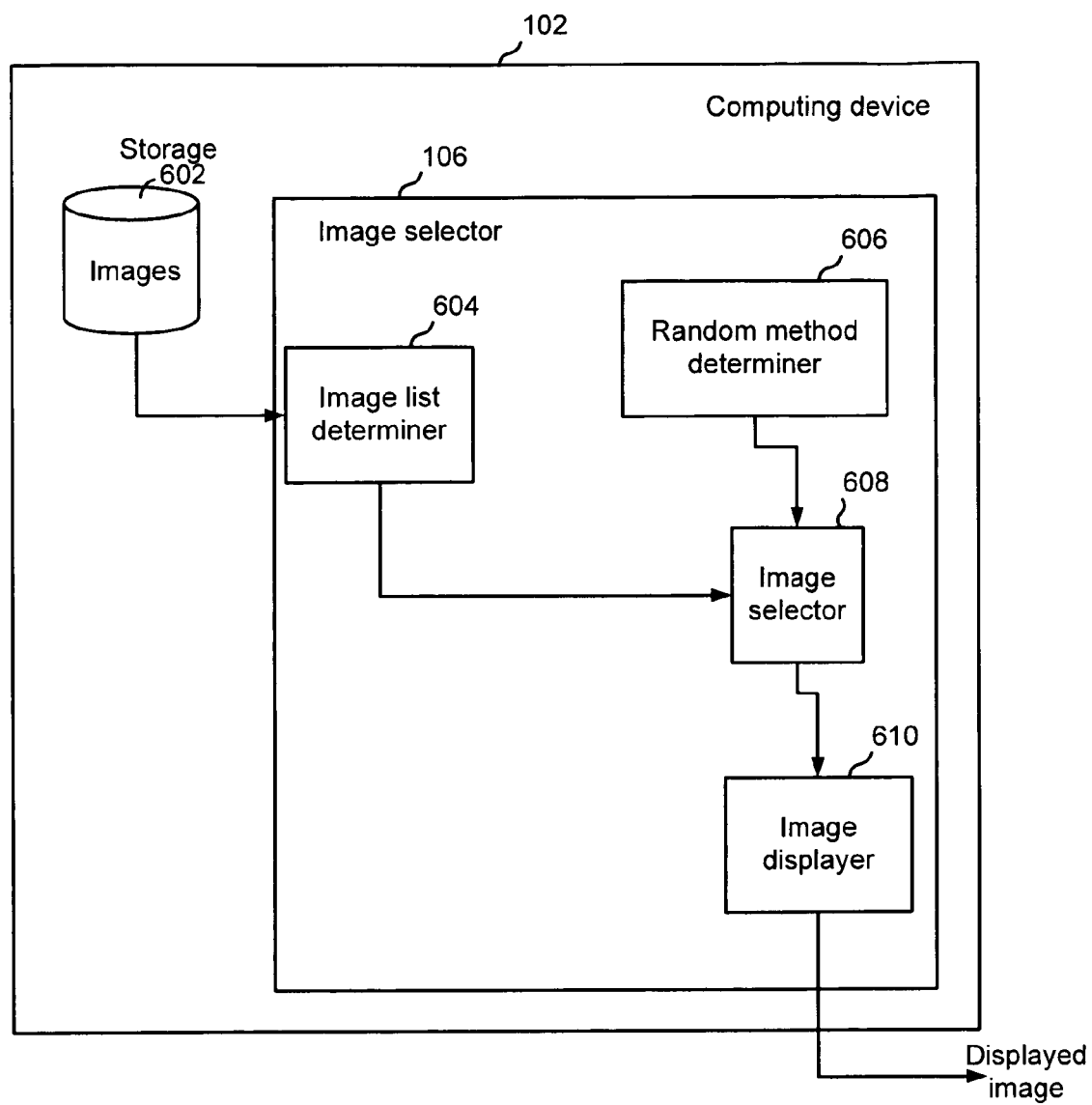
FIG. 6 depicts a more detailed example of a computing device and an image selector according to one embodiment.

FIG. 6 depicts a more detailed example of computing device 102 and image selector 106 according to one embodiment. Storage 602 is configured to store the images. The storage may include a flash drive, CD-ROM, read-only memory (ROM), memory stick, external flash drive, computing device, or any other kind of storage device.

An image list determiner 604 is configured to determine a list of images. In one example, every image stored in storage 602 may be used in a list to display. In other embodiments, portions of images stored in storage 602 may be used. For example, different lists of images may be displayed in different rounds.

A random method determiner 606 is configured to determine a method to randomly select images. If only one method is being used, a random method may not be selected for a plurality of random methods. Rather, the algorithm that is used to randomly select images is automatically determined. If multiple display methods may be provided, then random method determiner 606 determines which method to use.

An image selector 608 is configured to select an image to display. An image is selected randomly according to the random display method. Image selector 608 receives the list of images from image list determiner 604 and randomly selects one of them without selecting an image for display twice without displaying all the images in the list once in a round.

An image displayer 610 is configured to the display images. For example, the images may be displayed on display 104.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium or tangible medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
   (a) determining a list of images for display on a display device, wherein the display device is configured to display images in an order in a round, the round being a display of a number of images equal to a number of images in the list;
   (b) determining a first random display method to use to select an image to display on the display device, wherein the first random display method is selected from a plurality of random display methods;
   (c) randomly selecting an image from the list of images based on the determined random display method;
   (d) displaying the image on the display device;
   (e) determining a second random display method in the plurality of random display methods if a predetermined threshold of displayed images has been reached, wherein the second random display method replaces the first random display method as the determined random display method; and
   (f) performing (c)-(e) until all images from the list of images have been displayed in the round, wherein the first and second random display methods are used to ensure display of all images in the list of images once without displaying a duplicative image in the round.

2. The method of claim 1, wherein the predetermined threshold comprises a predetermined number of images that have already been displayed on the display device for the round.

3. The method of claim 1, further comprising:
   switching from the first random display method to the second random display method in the plurality of display methods;
   randomly selecting an image from the list of images based on the second random display method; and
   displaying the image on the display device, wherein the second random display method is used until all remaining images in the round are displayed.

4. The method of claim 3, wherein the first random display method is used again to start a new round of display of the number of images.

5. The method of claim 1, wherein the randomly selecting comprises:
   (g) assigning a list of identifiers for the list of images in a data structure;
   (h) randomly selecting an identifier from the list of identifiers;
   (i) determining if the selected identifier is found in the data structure;
   (j) if the selected identifier is found in the data structure, performing:
      determining an image corresponding to the selected identifier;
      displaying the image; and
      removing the image from the list of images;
   (k) if the selected identifier is not found in the data structure, not displaying image corresponding to the selected identifier; and
   (l) performing (g)-(k) until all images from the list of images have been displayed.

6. The method of claim 5, further comprising reinitializing the list of identifiers in the data structure and redisplaying the list of images in a new round.

7. The method of claim 5, further comprising removing the selected identifier in the data structure when the corresponding image is displayed.

8. The method of claim 7, further comprising moving the selected identifier to a second data structure.

9. The method of claim 5, wherein randomly selecting the identifier from the list of identifiers is performed using the list of identifiers after the selected identifier has been removed from the data structure.

10. The method of claim 5, wherein randomly selecting is performed using a random number generator that selects a random identifier in the list of identifiers.

11. The method of claim 1, wherein randomly selecting comprises:
    mixing the list of images randomly; and
    sequentially selecting identifiers from the mixed list of images for display.

12. The method of claim 1, wherein the first random display method comprises randomly selecting an image, and wherein the second random display method comprises randomly mixing remaining images and then sequentially selecting from among the mixed remaining images.

13. An apparatus comprising:
    one or more computer processors; and
    logic encoded in one or more tangible media for execution by the one or more computer processors, and when executed being operable to:
    (a) determine a list of images for display on the apparatus, wherein the apparatus is configured to display images in an order in a round, the round being a display of a number of images equal to a number of images in the list;
    (b) determine a first random display method to use to select an image to display on the apparatus, wherein the first random display method is selected from a plurality of random display methods;
    (c) randomly select, using the one or more computer processors, an image from the list of images based on the determined random display method;
    (d) display the image on the apparatus;
    (e) determine a second random display method in the plurality of random display methods if a predetermined threshold of displayed images has been reached, wherein the second random display method replaces the first random display method as the determined random display method; and (f) perform (c)-(e) until all images from the list of images have been displayed in the round, wherein the first and second random display methods are used to ensure display of all images in the list of images once without displaying a duplicative image in the round.

14. The apparatus of claim 13, wherein the predetermined threshold comprises a predetermined number of images that have already been displayed on the apparatus for the round.

15. The apparatus of claim 13, wherein the logic when executed is further operable to:
   switch from the first random display method to the second random display method in the plurality of display methods;
   randomly select an image from the list of images based on the second random display method; and
   display the image on the apparatus, wherein the second random display method is used until all remaining images in the round are displayed.

16. The apparatus of claim 13, wherein the logic operable to randomly select comprises logic operable to:
   (g) assign a list of identifiers for the list of images in a data structure;
   (h) randomly select an identifier from the list of identifiers;
   (i) determine if the selected identifier is found in the data structure;
   (j) if the selected identifier is found in the data structure, perform:
      determine an image corresponding to the selected identifier;
      display the image; and
      remove the image from the list of images;
   (k) if the selected identifier is not found in the data structure, not display image corresponding to the selected identifier; and
   (l) perform (g)-(k) until all images from the list of images have been displayed.

17. The apparatus of claim 16, wherein the logic when executed is further operable to reinitialize the list of identifiers in the data structure and redisplaying the list of images in a new round.

18. The apparatus of claim 16, wherein logic operable to randomly select the identifier from the list of identifiers is performed using the list of identifiers after the selected identifier has been removed from the data structure.

19. The apparatus of claim 13, wherein logic operable to randomly select comprises logic when executed further operable to:
   mix the list of images randomly; and
   sequentially select identifiers from the mixed list of images for display.

20. A non-transitory storage device including instructions executable by a processor for:
   (a) determining a list of images for display on a display device, wherein the display device is configured to display images in an order in a round, the round being a display of a number of images equal to a number of images in the list;
   (b) determining a first random display method to use to select an image to display on the display device, wherein the first random display method is selected from a plurality of random display methods;
   (c) randomly selecting an image from the list of images based on the determined random display method;
   (d) displaying the image on the display device;
   (e) determining a second random display method in the plurality of random display methods if a predetermined threshold of displayed images has been reached, wherein the second random display method replaces the first random display method as the determined random display method; and
   (f) performing (c)-(e) until all images from the list of images have been displayed in the round, wherein the first and second random display methods are used to ensure display of all images in the list of images once without displaying a duplicative image in the round.

* * * * *